UNITED STATES PATENT OFFICE.

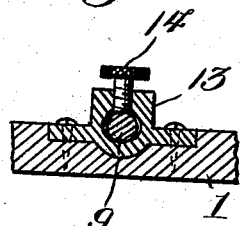
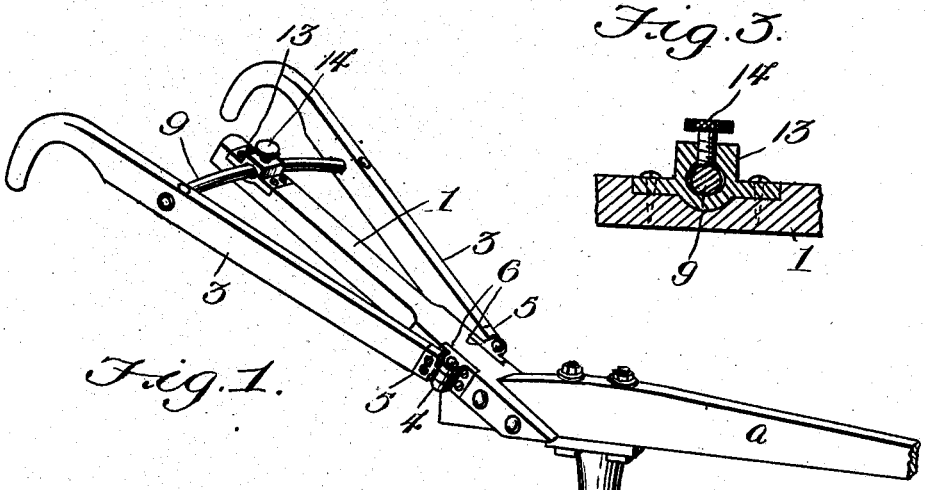
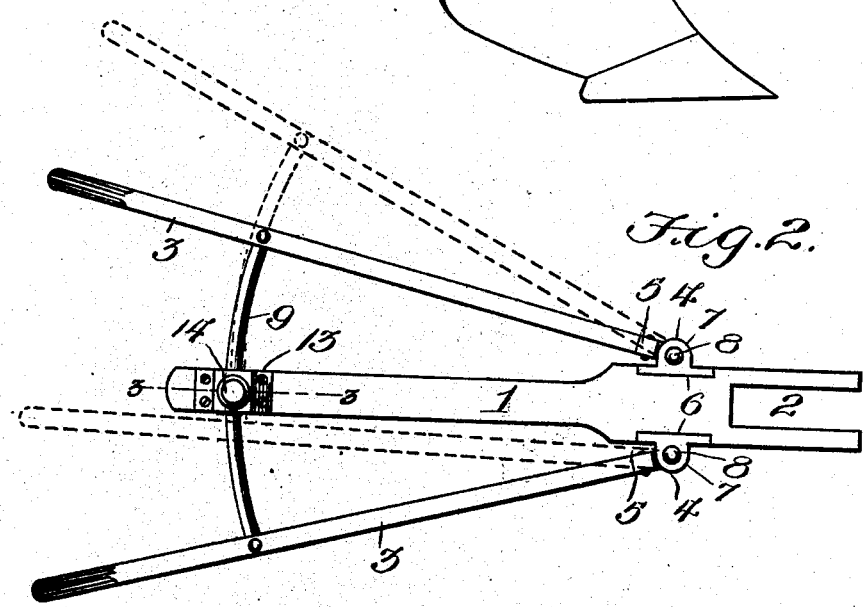

WHEELER J. STROUD AND WILLIAM J. JORDAN, OF HUMBOLDT, TENNESSEE.

ADJUSTABLE HANDLE.

No. 911,848.  Specification of Letters Patent.  Patented Feb. 9, 1909.

Application filed May 6, 1908. Serial No. 431,210.

*To all whom it may concern:*

Be it known that we, WHEELER J. STROUD and WILLIAM J. JORDAN, citizens of the United States, residing at Humboldt, in the county of Gibson and State of Tennessee, have invented new and useful Improvements in Adjustable Handles, of which the following is a specification.

This invention relates to improvements in adjustable handles for use in connection with cultivating plows, turning plows and the like implements and adapted to be adjusted laterally to any desired extent toward either side of the plow as may be required to obtain the best results when using the plow for cultivating growing plants such as tomatoes or other crops and also adapting the plow to be run in any desired or preferred position, and the said invention consists in the construction, combination and arrangement of devices hereinafter described and claimed.

In the accompanying drawings:—Figure 1 is a perspective view of a plow provided with adjustable or reversible handles constructed in accordance with this invention. Fig. 2 is a plan of the improved handles. Fig. 3 is a detail section.

In the embodiment of this invention, we provide a central arm 1 which is here shown as forked or bifurcated at its lower end as at 2 to enable it to be set astride of and bolted to the rear portion of the beam *a* of a plow of any ordinary form. On opposite sides of the central arm are handles 3, the lower ends of which are pivotally connected to the central arm as at 4, the said pivotal connections being here shown as hinge leaves 5 secured by screws to the lower ends of the handles and plates 6 rabbeted in opposite sides of the central arm and provided with outstanding hinge lugs 7 for the reception of the pintles 8. Any other suitable means may be employed to pivotally connect the handles to the center arm without departing from the spirit of this invention. The said handles are connected together at a suitable distance from their upper ends by means of a curved cross bar 9 which is in effect a rung. On the upper side of the center arm near the rear end thereof is a bearing and guide 13 through which the rod or rung 9 passes so that said rod or rung is adapted to be moved in the direction of its own length when the handles 3 are adjusted to any desired angular position with reference to the center arm 1 and to either side of said center arm, and said guide bearing is provided with means, here shown as a set screw 14, to engage said rod or rung and clamp or lock the same to the said guide bearing to hold the handles in the required adjusted position.

Having thus described the invention, what we claim as new and desire to secure by Letters Patent is:—

1. A device of the class described comprising a center arm for attachment to a plow or the like implement, handles mounted on opposite sides of and pivotally connected to said center arm for angular movement toward and from the same, means connecting the said handles together and means to secure the handles in adjusted position.

2. A plow or like implement having a rearwardly extending center arm provided with a guide device, handles mounted on opposite sides of and pivotally connected to said center arm for angular movement toward and from the same and a connecting element between the said handles operating in the said guide device.

3. A plow or like implement having a rearwardly extending center arm provided with a guide device, handles mounted on opposite sides of and pivotally connected to said center arm for angular movement toward and from the same and a connecting element between the said handles operating in the said guide device, and means coacting with such connecting element to secure the handles in an adjusted position.

In testimony whereof we affix our signatures in presence of two witnesses.

WHEELER J. STROUD.
WILLIAM J. JORDAN.

Witnesses:
J. D. SUMMERVILLE,
W. H. WOODARD.